United States Patent [19]

Serres

[11] Patent Number: 5,772,000
[45] Date of Patent: Jun. 30, 1998

[54] HOP VINE TRANSFER SYSTEM

[76] Inventor: Paul J. Serres, 11283 Serres La. NE., Woodburn, Oreg. 97071

[21] Appl. No.: 623,357

[22] Filed: Mar. 28, 1996

[51] Int. Cl.[6] .................................................. B65G 37/00
[52] U.S. Cl. ....................................... 198/369.5; 198/363
[58] Field of Search ................................. 198/363, 369.1, 198/369.5, 448, 626.1, 861.5, 604, 605

[56] References Cited

U.S. PATENT DOCUMENTS

| | | |
|---|---|---|
| 252,960 | 1/1882 | Moore . |
| 1,090,966 | 3/1914 | Berghoefer . |
| 1,126,696 | 2/1915 | Brigham . |
| 1,190,337 | 7/1916 | Stecher . |
| 1,548,278 | 1/1925 | Phillips et al. . |
| 2,064,728 | 12/1936 | Calcott et al. . |
| 2,237,197 | 4/1941 | Pomieraniec . |
| 2,250,933 | 7/1941 | Manierre . |
| 2,274,793 | 3/1942 | Keating . |
| 2,334,384 | 11/1943 | Cohen ................................... 198/369.5 |
| 2,448,063 | 8/1948 | Thys . |
| 2,700,452 | 1/1955 | Regimbal et al. . |
| 2,757,785 | 8/1956 | Dauenhauer . |
| 2,802,562 | 8/1957 | Wissemann . |
| 3,316,916 | 5/1967 | Dauenhauer et al. . |
| 3,371,767 | 3/1968 | Rehr et al. ............................. 198/363 |
| 5,188,210 | 2/1993 | Malow .................................. 198/369.5 |
| 5,199,550 | 4/1993 | Wachi et al. ......................... 198/626.1 |

*Primary Examiner*—James R. Bidwell
*Attorney, Agent, or Firm*—Christensen O'Connor Johnson & Kindness

[57] ABSTRACT

A hop vine transfer system (10) includes a plurality of magazines (14a, 14b, 14c) each fed by an associated unloader mechanism (12). Once a magazine has been filled with hope vines (V), it is unloaded by a pivoting transfer conveyor (16) having an entrance end (50) alignable with the exit end portion (48) of the magazine. The opposite exit end (91) of the transfer conveyor is disposed in operable engagement with a picking machine conveyor (18) that moves the hop vines, with their stub ends upwardly, through a picking machine (22) to remove the hops from the vines.

52 Claims, 5 Drawing Sheets

HOP VINE TRANSFER SYSTEM

FIELD OF THE INVENTION

The present invention relates to hop picking machines, and more particularly to transferring the hop vines from a plurality of unloading stations to a vertical hop picking machine.

BACKGROUND OF THE INVENTION

One common type of hop picking machine consists of two vertical, moving curtains spaced closely together to receive vertically suspended hop vines therebetween. The curtains include a plurality of fingers or tines that extend outwardly from the curtains toward the opposite curtain. The hop vines are suspended from a conveyor above the picking machine with the butt portions of the stems upward. The conveyor moves the vines through the gap separating the two moving curtains while the curtain tines, traveling downwardly with the curtains, pick or strip the hops from the vines. The picked hops fall to a conveyor belt at the bottom of the picking machine that transports the hops away to be separated from stems and leaves that also were detached from the vine. The hops are then carried to a drying area to remove moisture from the hops.

The hop vines are transported from the field to the plant housing the picking machine and then are fed into the picking machine with the butt ends of the vines lifted high in the air to the top of the picking machine, which may be 30–40 feet above the plant floor. U.S. Pat. No. 2,757,785 discloses a boom for lifting hop vines from a transport truck to the entrance of a vertical picking machine. An endless chain is carried by the boom to travel upwardly from the bottom end of the boom at the truck to the top entrance end of the picking machine. A plurality of vine grippers are spaced along the endless chain into which the butt ends of the vines are manually placed by a workman. The boom is designed to pivot about a vertical axis adjacent the picking machine thereby swinging the lower end of the boom sideways so that the boom can be positioned directly over the truck being unloaded. The vine transfer system of the '785 patent is limited in that only a single vine transport vehicle at a time may be unloaded. This limits the rate at which vines may be picked by the picking machine. During the time an unloaded vehicle is driven away and a full vehicle driven into position, no vines are being carried upwardly to the picking machine by the boom.

Vine transfer systems have been developed utilizing multiple unloading stations. In one such system, hop vines are attached to hooks that are carried along tracks that extend upwardly from the plant floor to the ceiling area. The hooks are moved upwardly along the tracks by a drive chain. The individual tracks after reaching their highest elevation are then inclined downwardly toward a singular feeding track leading to the entrance end of a hop picking machine whereat the vines are removed from the hooks and transferred to a transversely situated picking machine conveyor or pinch track. The hooks travel by gravity feed from the highest elevations of the individual tracks downwardly to intersect with the singular feeding track. Vines are accumulated along an individual track and then the accumulated vines are released as a group to enter the feeding track. Once an individual track has been unloaded, the vines that have accumulated in the next individual track are released into the feeding track. In this manner, the endeavor is to always have a supply of vines cued on the feeding track so that the vines may be continuously fed into the picker.

However, the hooks travel by gravity from the highest point of their individual tracks to the feeding track and also by gravity along the feeding track to the entrance of the picking machine conveyor. Foreign objects and other causes may impede the travel of the hooks along the individual tracks and the feeding track. Also, not infrequently, the vines detach from the hooks and fall to the plant floor. In addition, the hooks may bind or otherwise become stuck in the various tracks, whether the individual tracks, the feeding track or the track leading from the entrance of the picking machine back down to the plant floor. When any of the foregoing problems occur, human labor is required to rectify the situation.

The present invention seeks to address the foregoing problems by providing a vine transfer system capable of feeding a hop picking machine with a constant supply of vines at a faster rate and more reliably than heretofore possible. Toward this end, with the present invention the hop vines are always securely held during their entire travel from the unloading station to the hop picking machine.

SUMMARY OF THE INVENTION

A hop vine transfer system to supply hop vines to a hop picking machine includes a plurality of hop vine magazines for receiving and temporarily storing hop vines. The magazines each include grippers extending along the magazine from its entrance to its exit ends, the grippers being capable of gripping the hop vine stubs. Each magazine entrance end is cooperatively associated with a feeder system for feeding the stub portions of the hop vines into the magazine. In each of the magazines, the grippers are capable of moving or traveling from the entrance to the exit ends of the magazines. A transfer conveyor is alignable with the exit ends of the magazines to move the hop vines that have collected in the magazines and transfer the hop vines to the entrance of the hop picking machine. Once the magazine has been emptied by the transfer conveyor, the magazine is refilled with hop vines by its associated feeder system. Concurrently, the transfer conveyor is moved to align with the exit end of another magazine for the unloading thereof.

In a further aspect of the present invention, the exit end portions of the hop vine magazines converge towards a point. In a still further aspect of the present invention, the magazines, or at least the exit end portions of the magazines, extend along a substantially straight line. In a related further aspect of the present invention, the transfer conveyor pivots about an axis distal from the magazines so as to align the entrance end portion of the transfer conveyor with the exit end portions of the magazines. In yet another related aspect of the present invention, the magazines, or at least the exit ends of the magazines, converge towards the pivot axis of the transfer conveyor.

In an additional aspect of the present invention, the grippers of the hop vine magazines include a pair of endless lines that are disposed in substantially parallel side-by-side relationship to each other to define inward runs located closely adjacent to each other so as to grip the butt portions of the hop vines therebetween. Line guides extend along the lines, or at least the inward runs of the lines, to restrain the lines from retracting transversely away from the inward run of the opposite endless line. The two endless lines of the magazine are powered to move together in unison.

In accordance with a further aspect of the present invention, the individual hop vines are spaced uniformly apart from each other along the length of the magazine. This is accomplished by automatically moving the grippers of the magazines a selective distance along the magazine upon receipt of a hop vine from the associated feeder system. Also, a sensing system is employed to sense when a magazine has been filled with vines so as to discontinue operation of the feeder system. Subsequently, when the magazine has been emptied by transfer of the vines onto the transfer conveyor, the feeding system is reactivated to again fill the magazine with further hop vines.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
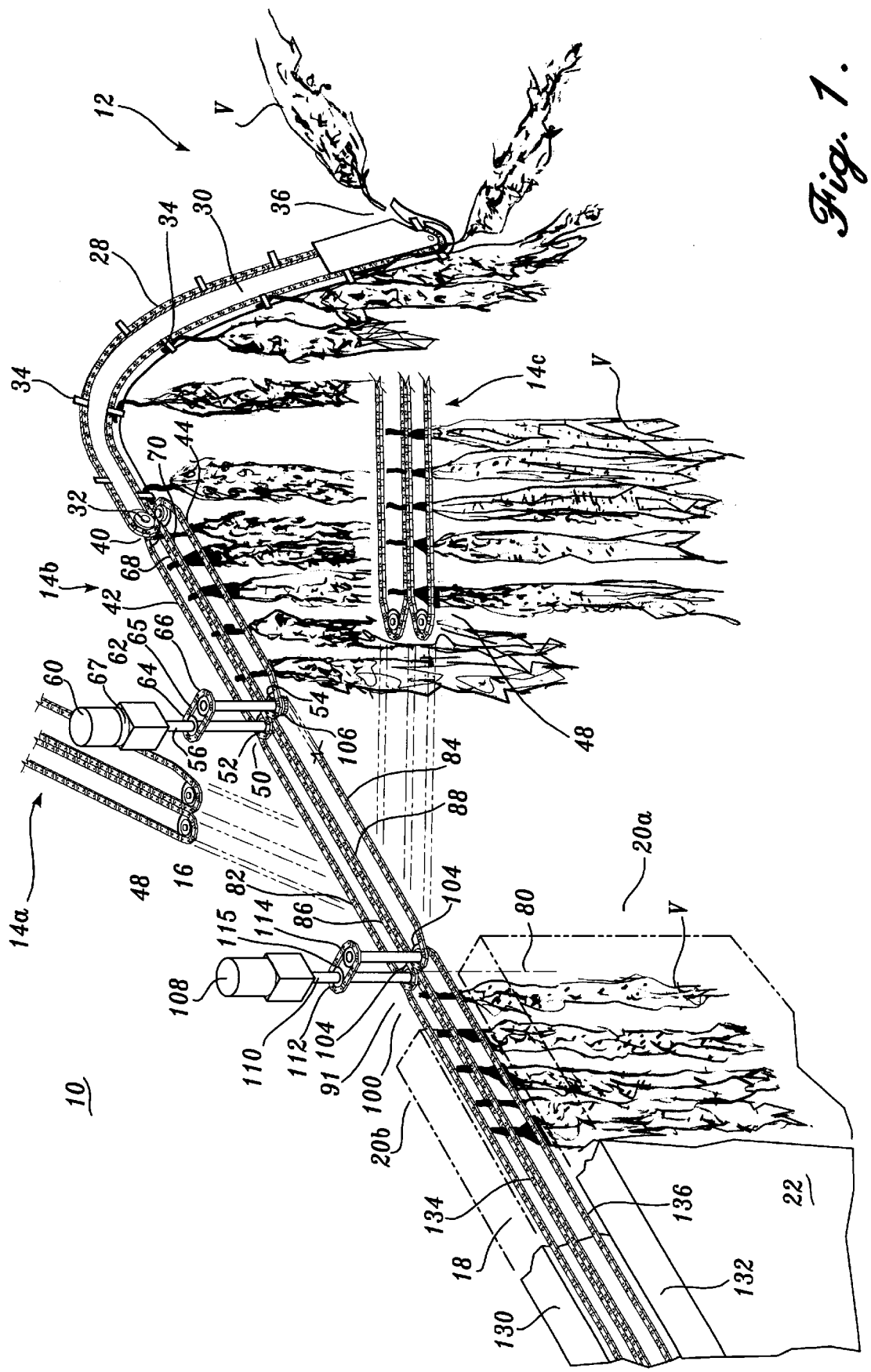
FIG. 1 is a pictorial view, principally in schematic, illustrating the hop vine transfer system of the present invention.

Referring to the figures, the vine transfer system 10 of the present invention includes an unloader mechanism 12 for lifting hop vines V (with the butt ends upwardly) from the plant floor to an elevation high above the plant floor (typically near the ceiling of the plant) to release the vines at the entrance end of a magazine 14. Although not shown in the drawings, each of the three magazines 14a, 14b and 14c illustrated employs a corresponding unloader mechanism in the manner of mechanism 12. The magazines 14a, 14b and 14c receive and accumulate the vines V from their corresponding unloader mechanism, and then release the vines to a pivoting transfer conveyor 16, when the adjacent free end of the transfer conveyor is aligned with the exit end of the magazine.

The transfer conveyor 16 transfers the vines V to the entrance end of a picking machine conveyor 18 that extends above and between the two picking banks 20a and 20b of a picking machine 22. Each of the picking banks includes a vertical curtain that travels downwardly from the top to the bottom of the picking machine. The curtains carry a plurality of projecting tines or fingers, not shown, that strip the hops from the vines, which then drop to a belt conveyor, not shown, traveling beneath the picking machine along the gap defined by the two banks of the machine to carry the hops away from the picking machine to various stations for separating the hops from stems and leaves which were also detached from the vines. Thereafter, the hops are sent to a drying room to remove moisture therefrom. The picked vines, and separated stems and leaves, are collected and carried away from the plant, typically back out to the field for use as mulch.

To describe the vine transfer system 10 of the present invention in greater detail, the unloader mechanism 12 includes an endless chain 28 that rides along a track defined in part by a housing 30 which encloses part of the run of the endless chain leading from the floor to the top of the unloader and also the lower portion of the return run of the endless chain leading from the top of the loader back down to the floor. As shown in FIG. 1, the housing 30 extends along the back side (into the page in FIG. 1) of the chain 28 and also partially covers the front side of the chain at the bottom of the unloader mechanism. Although not shown, a chain sprocket is positioned at the bottom of the housing 30 and a second sprocket 32 is positioned at the top of the housing for engagement with the lower and upper ends of the chain 28.

A plurality of unloader vine graspers 34 are mounted transversely to the length of the chain 28 at positions spaced along the chain. The stub end of vine V is inserted within an entrance opening 36 formed at the lower portion of the housing 30 whereupon the stub end is grasped by the vine grasper 34 thereby to pinch the hop vine against the adjacent surface of the housing extending along the backside of the chain. In this manner, the vine is lifted upwardly along the unloader mechanism to the top thereof The upper end of the unloader mechanism is disposed slightly above and overlaps a short distance with the entrance end 40 of the magazine 14b. As the vine V reaches the upper end of the unloader mechanism, the vine is released by the vine grasper 34, by which time the vine has been grasped by the entrance end 40 of the magazine 14b.

The magazines 14a, 14b and 14c are similarly constructed. As such, only the construction of magazine 14b will be described in detail, with the understanding that the magazines 14a and 14c are similarly composed. Magazine 14b in basic form includes a pair of endless lines in the form of endless chains 42 and 44 supported by a frame structure 46, which is illustrated in the drawings, with portions broken away so as to more clearly view the endless chains. At the entrance end 40 of the magazine, the frame structure 46 supports the chains 42 and 44 just below the bottom run of endless chain 28 of the unloader mechanisms 12. At the exit end 48 of the magazine, the frame structure 46 supports the endless chains 42 and 44 just above the entrance end 50 of the transfer conveyor 16.

Powered sprockets 52 engage the endless chains at the exit end 48 of the magazine whereas idler sprockets 54 engage the endless chains at the entrance end of the magazine. Both the powered sprockets and the idler sprockets are mounted on bearing members, not shown. One of the sprockets 52 is driven by a drive shaft 56, powered by an electric motor 60 through a gear reduction box 62. Just below the gear reduction box, a second sprocket 64 is mounted on the drive shaft 56 and a comparable sprocket 66 is mounted on the other drive shaft. The two sprockets 64 are interconnected by a chain 65 so that the sprockets 64 and 66, and thus, also the sprockets 52 and 54 are rotated in unison. As a consequence, the endless chains 42 and 44 move at the same speed relative to each other. Ideally an adjustable speed reducer 67 is positioned between the electric motor 60 and the gear box 62 to selectively alter the speed of the endless chains 42 and 44.

Figure 3:
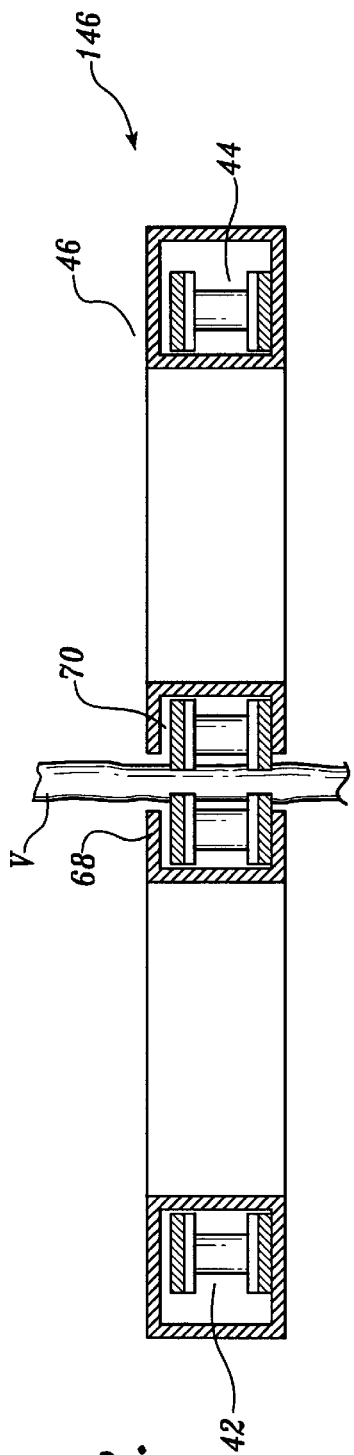
FIG. 3 is a cross-sectional view taken along lines 3—3 of FIG. 2 illustrating the construction of one of the magazines.

The frame structure 46 of the magazine also serves as a guide for the endless chains 42 and 44 so that the inward runs 68 and 70 of the chains are positioned very close together along the length of the magazine, except at the entrance and exit ends. As a result, the inward chain runs 68 and 70 serve as pinch tracks or "moving jaws" to pinch the stub portions of the vine stems therebetween with the remainder of the vines suspended downwardly therefrom. As shown most clearly in FIG. 3, the frame structure 46 adjacent the inward chain runs 68 and 70 may be substantially U-shaped in cross section with the web portion thereof serving as a backing for the chain and the flanges thereof constraining the chain in the vertical direction. The frame structure of the outward chain runs may be the form of a tube through which the chain travels.

As a vine V, being carried by unloader mechanism 12, approaches the entrance end 40 of magazine 14b, a limit switch 72 (see FIG. 5) is tripped by the passing vine, activating electrical motor 60 to cause simultaneous advancement of the endless chains 42 and 44 for a short period of time. During this time period, the vine V engages with the entrance end of the magazine 14b, between the inward runs 68 and 70 of the chains to be grasped thereby and advanced a short distance forwardly before the next vine being carried by the unloader trips the limit switch to maintain the endless chains 42 and 44 in motion. However, if one of the vine graspers 34 of the unloader 12 is empty, the limit switch will not be retripped, and thus, the electric motor 60 is deactivated. In this manner, the vines V are uniformly spaced apart along the length of the magazine 14b until the magazine is filled, whereupon the unloader mechanism 12 is deactivated so that no further vines V are loaded onto the magazine 14b until the magazine is unloaded onto the transfer conveyor 16, as discussed more fully below. The filled magazine is sensed by a limit switch 74 located at the exit end portion 48 of the magazine, see FIG. 5. The forwardmost vine V will trip the limit switch 74 when it advances to the exit end portion of the magazine.

Ideally, the vines V are positioned about 18 inches apart along the magazine so that the vines are similarly spaced apart from each other when traveling through the picking machine 22. The vines may be spaced closer together along the magazine, for instance, as close as about 12 inches apart. However, the speed of the transfer conveyor 16 and/or the picking machine conveyor 18 will have to be increased so as to achieve a desired spacing of about 18 inches in the picking machine conveyor.

Figure 2:
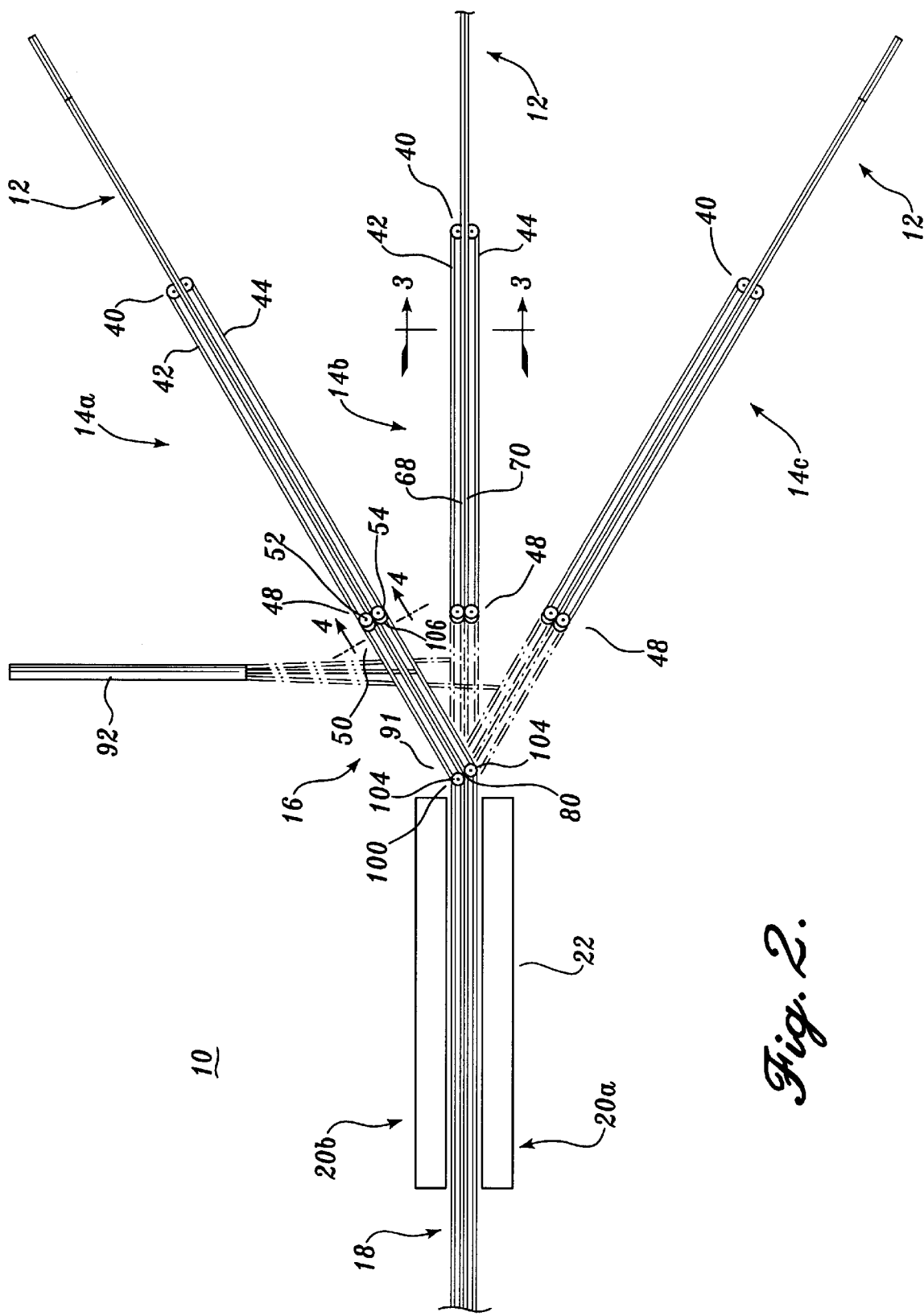
FIG. 2 is a schematic plan view of FIG. 1.

As illustrated in FIGS. 1 and 2, the magazines 14a, 14b and 14c are oriented so that their exit end portions 48 converge towards each other. Ideally, the exit end portions of the magazines are aligned with the pivot axis 80 of the transfer conveyor 16, as discussed more fully below. Also, ideally, but not essentially, the magazines 14a, 14b and 14c are disposed along straight lines each radiating from the pivot axis 80. Also in accordance with a preferred embodiment of the present invention, the magazines 14a, 14b and 14c are each of the same length, of sufficient length to hold approximately sixty vines at a spacing of from 12 inches to about 18 inches apart. Although three magazines 14a, 14b and 14c are illustrated, two magazines could be utilized, especially if the magazines are lengthened from the length set forth above. Also, more than three magazines may be utilized, especially if the magazines are relatively short in length, or if the picking machine 22 is of relatively high speed.

Ideally the transfer conveyor 16 is constructed somewhat similarly to the magazines 14 in the sense that the transfer conveyor also includes a pair of endless lines in the form of endless chains 82 and 84 positioned side by side to define closely spaced apart inward runs 86 and 88 to grip and transport the vine stems therebetween. In addition, ideally the chains 82 and 84 are mounted on a frame structure 90 that is pivotal about the vertical axis 80 located at the rearward or exit end portion 91 of the transfer conveyor 16.

The frame structure 90 is pivoted by a linear actuator 92 disposed transversely to the frame structure, near the forward, free end of the frame structure. The linear actuator includes a cylinder portion having its rearward end pinned to a stationary location relative to the vine transfer system 10 and an extendible rod 96 having a clevis 98 at its free end for pinning to the frame structure 90. The linear actuator may be powered by air or hydraulic fluid. In addition, the cylinder 94 and rod 96 may be replaced by a different type of actuator, for instance, one that is electrically powered. It is to be understood that the frame structure 90 can be pivoted by methods other than the linear actuator 92. For instance, the linear actuator 92 can be replaced by a rack and pinion assembly, not shown.

As illustrated in FIG. 1, the frame structure 90 supports the transfer conveyor 16 such that the entrance end 50 of the conveyor is positioned at an elevation just below the exit end portion of the magazines 14 and somewhat overlaps the underside of the magazines. At the opposite exit end 91 of the transfer conveyor, the endless chains 82 and 84 somewhat overlap and are located slightly above the entrance end 100 of the picking machine conveyor 18.

Figure 4:
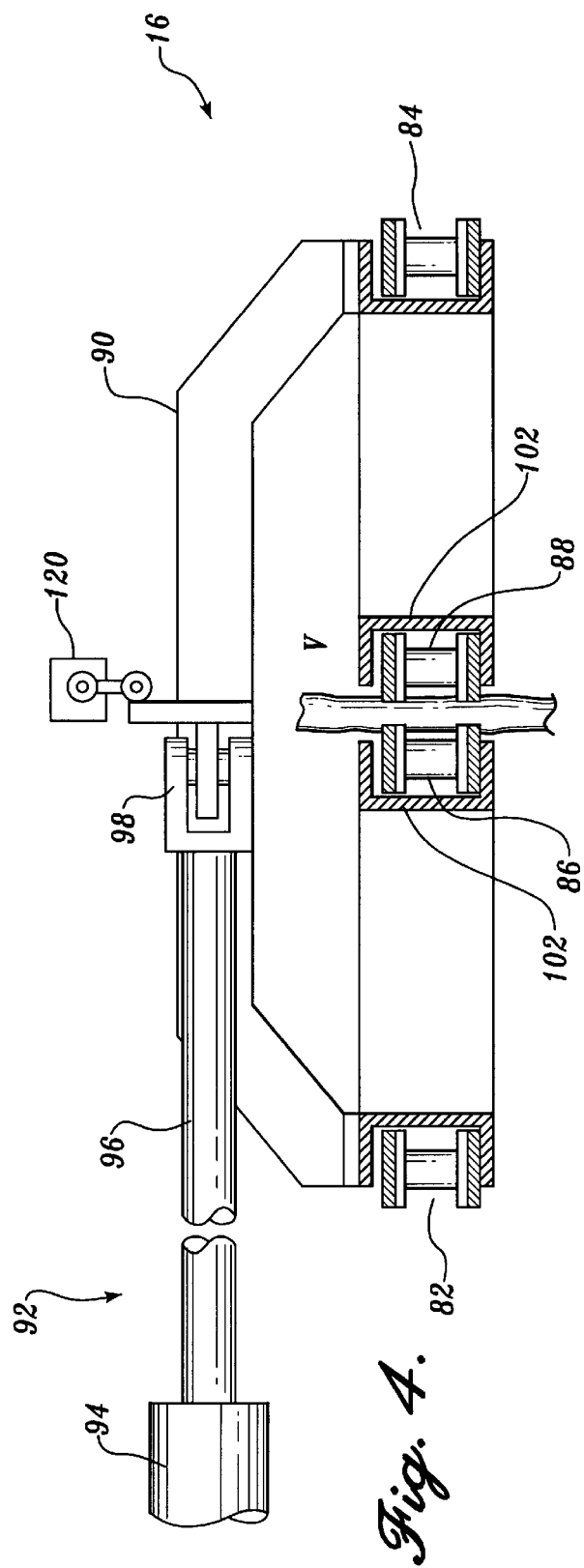
FIG. 4 is a cross-sectional view taken along lines 4—4 of FIG. 2 illustrating the construction of the transfer conveyor.

In addition, ideally the frame structure 90 includes chain guide and backing portions 102 extending along the inner runs 86 and 88 of the chains 82 and 84 to support such inner runs in closely spaced relationship to each other. As illustrated in FIG. 4, in cross section the chain guide and backing portions 102 are generally in the shape of a channel having a vertical web portion extending along the chain inner runs 86 and 88 and transverse bottom and top flanges to contain the chain inner runs vertically.

Drive sprockets 104 are mounted at the exit end of the transfer conveyor to engage the endless chains, and idler sprockets 106 are rotatably mounted at the entrance end 50 of the transfer conveyor to likewise engage the endless chains. A drive motor 108, through a drive shaft 110, powers one of the drive sprockets 104. A second sprocket 112 is mounted on the drive shaft 110 at an elevation between sprocket 104 and motor 108 and a corresponding sprocket 114 mounted on the drive shaft of the adjacent sprocket 104. The two sprockets 112 and 114 are interconnected by a drive chain 115 so that the drive sprockets 104 and the endless chains 82 and 84 are driven at the same speed by the motor 108. Also ideally the speed at which chains 82 and 84 are driven corresponds reasonably closely to the speed at which the endless chains 42 and 44 of the magazines 14 are driven so that relatively smooth transfer of the vines V occurs from the magazines to the transfer conveyor.

As shown in FIG. 4, proximity switches 120 are positioned adjacent the exit ends 48 of each magazine 14a, 14b and 14c to align the entrance end 50 of the transfer conveyor with the exit ends of the magazines when the transfer conveyor is swung from magazine to magazine. Of course, the proximity switches may be replaced by other well-known systems for accomplishing alignment of the transfer conveyor and the magazines.

Ideally the picking machine conveyor 18 is constructed somewhat similarly to the magazines 14 and the transfer conveyor 16 in that the picking machine conveyor also is composed of a pair of endless chains 130 and 132 disposed in side-by-side relationship. Likewise the picking machine conveyor includes a frame structure, not shown, that guides and supports the inner runs 134 and 136 of the endless chains in closely spaced relationship to each other thereby to pinch the stub ends of the vines V therebetween as the vines are carried through the picking machine 22. Due to the similarity of construction of the picking machine conveyor 18 with the magazines 14 and transfer conveyor 16, the other aspects of the picking machine conveyor need not be described in particularity.

In operation, the picking machine conveyor 18 operates to continuously feed vines into the picking machine. At the opposite end of the vine transfer system an individual vine V is placed within the entrance 36 of an unloader mechanism 12 to be carried upwardly to the entrance end 40 of a first magazine whereupon the vine trips a proximity switch 72 causing the endless chains 42 and 44 of the magazine to be activated to receive the stub end of the vine and advance the vine a fixed distance forwardly along the magazine. This process is repeated with the next vine V which is carried upwardly by the unloader mechanism 12 until the first magazine 14 is full. The full condition of the magazine is sensed by contact of a vine against proximity switch 74 located at the exit end 48 of the magazine, causing a signal to be sent to a programmable controller 140, FIG. 5. Thereupon the programmable controller deactivates the unloader mechanism. The other two magazines 14 are loaded in a similar manner.

Under the control of the programmable controller 140, The transfer conveyor 16 is rotated about axis 80 to be placed in alignment with the filled first magazine 14, or at least the exit end portion 48 of the magazine. Thereupon, again under the control of the programmable controller 140, the endless chains 82 and 84 of the transfer conveyor 16 and the endless chains 42 and 44 of the first magazine 14 are powered to transfer the vines V from the first magazine 14 onto the transfer conveyor 16, and then the vines are transferred onto the picking machine conveyor 18 for carriage through the picking machine.

When the first magazine 14 has been unloaded (which is determined by a timed period programmed into the programmable controller), the transfer conveyor 16 swings to the next filled magazine, which previously had been loaded with vines V, and begins the unloading process anew. Simultaneously the unloader mechanism 12 associated with the just emptied first filled magazine is activated by the programmable controller to begin filling the magazine with vines V until the magazine is again filled. When the second filled magazine 14 has been emptied by the transfer conveyor, the transfer conveyor is then swung into alignment with the third filled magazine 14 to then unload that magazine. Thereupon the unloader mechanism associated with the second filled magazine is activated by the programmable controller to reload the second magazine with vines. This process of loading the magazines with the unloader mechanisms and then sequentially unloading the filled magazines with the transfer conveyor is continually repeated. In the present process, normally one of the magazines is being unloaded, a second magazine is full and waiting for unloading and a third magazine is being loaded.

It is to be understood that the programmable controller 140 is programmed to swing the transfer conveyor from the magazine 14 that has just been unloaded to the next filled magazine. As such, the magazines are not always emptied in sequence, the emptying sequence might not always be magazine 14a, 14b, 14c, 14a, 14b, 14c. . . , rather a magazine that has been more recently unloaded may be filled sooner than a magazine that was less recently unloaded, and thus, the more recently unloaded magazine will be again unloaded prior to unloading an earlier unloaded magazine. For instance, the magazines may be unloaded in the order 14a, 14c, 14b, 14c, 14a . . . .

Figure 5:
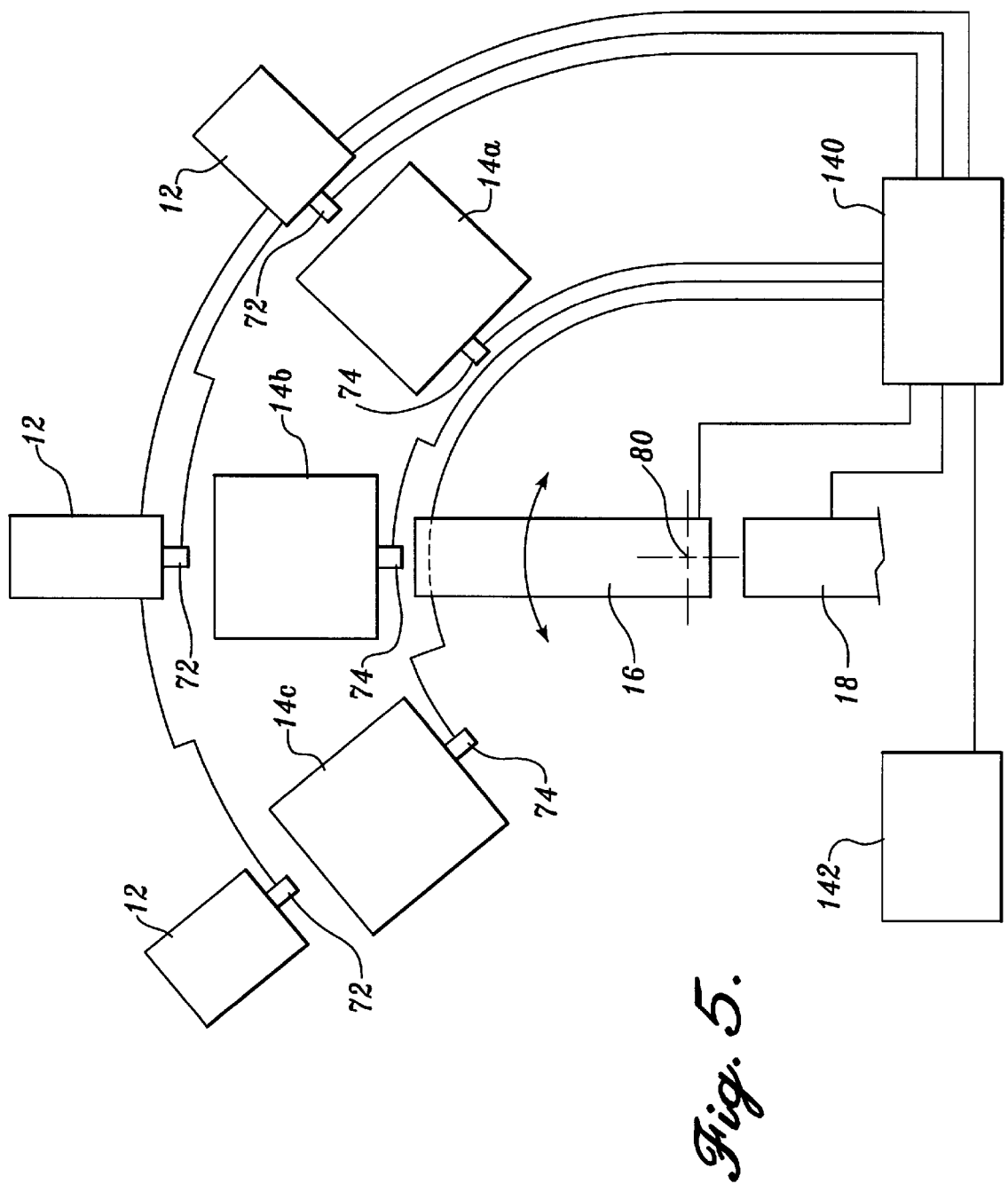
FIG. 5 is a schematic diagram illustrating a control system for the hop vine transfer system of the present invention.

Also, as illustrated in FIG. 5, the programmable controller may be manually overridden at control panel 142, ideally located at the bottom of the unloaders 12. A situation in which it may be desirable to manually override the programmable controller is if only one unloader station is being utilized, wherein it would be desirable for not only the unloader to be continually operated, but also the corresponding magazine to be continually operated and the transfer conveyor to be fixed in alignment with the magazine and also continually operated thereby to achieve steady unloading of a transport vehicle.

In another situation in which the programmable controller might be overridden is if at the end of the unloading of a vehicle, only a few vines are left. It may be desirable to unload these few remaining vines rather than waiting until the magazine is unloaded by the transfer conveyor so that the unloading process could resume under the control of the programmable controller 140. In this situation, the manual control 142 may be utilized to continue to operate the unloader station and corresponding magazine until the remaining few vines have been unloaded from the vehicle.

Applicant has found that through the method and apparatus of the present invention, the vines V are fed to the picking machine at a uniform and faster rate than heretofore possible. This is accomplished through the construction of the preset vine transfer system, including the fact that the vines V are always securely held during their travel along the vine transfer system. As such, the vines do not have the opportunity to fall to the floor in the manner of existing vine transfer systems.

Figure 6:
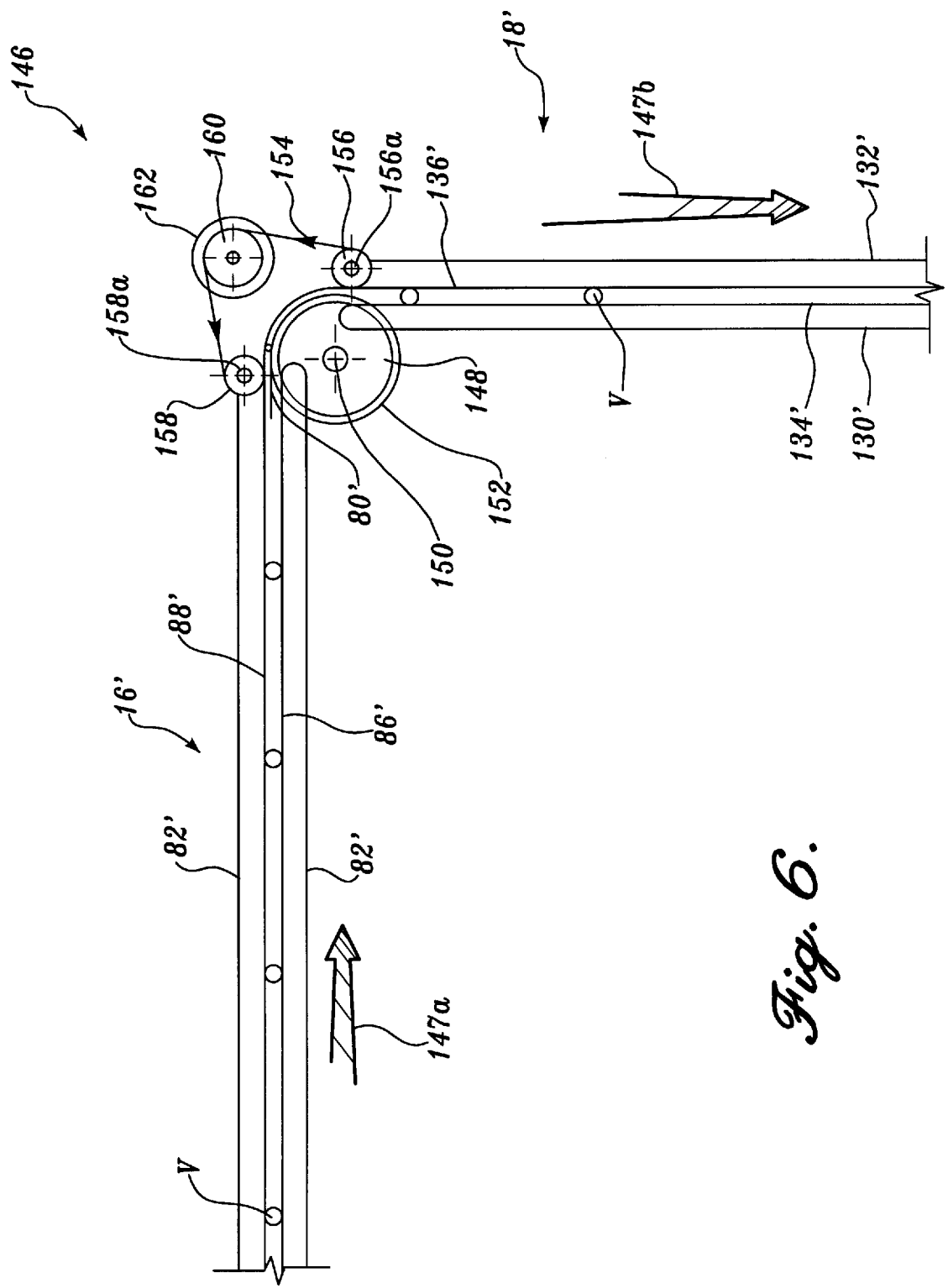
FIG. 6 is a schematic, fragmentary plan view of a further embodiment of the present invention.

A further preferred embodiment of the present invention is illustrated in FIG. 6 wherein a transfer conveyor 16' is nominally disposed at about a 90° angle from a picking machine conveyor 18'. This configuration allows the magazines (not shown) to be positioned transversely to the picking machine rather than longitudinally of the picking machine as shown in FIG. 1. In some existing picking machine installations, it may not be possible to position the magazines lengthwise of the picking machine. (In FIG. 6, components of the present embodiment corresponding to the prior embodiment shown in FIGS. 1–5 are given the same part number, but with the addition of a prime "'" designation.) As in the embodiment of the present invention shown in FIGS. 1–5, the transfer conveyor 16' shown in FIG. 6 is adapted to pivot about axis 80' so as to align with the exit end portions of the various magazines.

As illustrated in FIG. 6, a junction assembly 146 is positioned at the intersection of the adjacent ends of the transfer conveyor 16' and machine conveyor 18' to transfer vines V from the transfer conveyor to the picking machine conveyor. The vines V move in the direction of arrows 147a and 147b. The junction assembly includes an idler sheave 148, anti-frictionally mounted about a vertical axis 150, which can be accomplished by numerous standard methods. Ideally the idler sheave is about from 12–24 inches in diameter with its outer circumference 152 rimmed with a resilient, but tough material, for instance, rubber, natural rubber or similar material.

Also, ideally the outer circumference of sheave 148 is tangentially aligned with the inner run 86' of endless chain 82' of the transfer conveyor as well as tangentially aligned with the inner run 134' of endless chain 130' of the picking machine conveyor 18'. Also preferably but not essential, the idler sheave 148 has a thickness of about two inches, but can be thinner or thicker. Further, preferably the idler sheave 148 is located below the elevation of endless chain 82' and above the elevation of endless chain 130'. As a result, when a vine V is transferred from the transfer conveyor 18' to the picking machine conveyor 16', the picking machine conveyor will grip vine at a different location along the vine stub then was gripped by the transfer conveyor. This reduces the likelihood that the vine stub will break as the vine travels through the picking machine. As will be appreciated, during the picking process, a significant downward tension is placed on the hop vine by the fingers (or tines) used to remove the hops from the vines.

The junction assembly 146 also includes an endless line in the form of an endless chain 154 that extends around a portion of the perimeter of idler sheave 148 extending at least between the tangential intersection of the outer circumference of idler sheave with the chain inner run 86' and the tangential intersection of the outer circumference of the idler sheave with chain inner run 134'. In actuality, the endless chain 154 extends somewhat further along these two endless chains, beyond their tangential intersection locations with the idler sheave. The extent to which the endless chain 154 extends along the outer circumference of the sheave 148 is defined by the location of idler sprockets 156 and 158 which are anti-rotationally mounted about vertical shafts 156a and 156b by standard methods.

The endless chain 154 is driven by a drive sprocket 160 which is powered by a drive motor 162. Accordingly, as vines V travel along the transfer conveyor 16', upon their exit from the transfer conveyor they are grasped by the outer circumference 152 of idler sheave 148 and the adjacent face of the powered chain 154. The vine travels clockwise about sheave axis 150 as the sheave rotates by virtue of the vine V being held relatively tightly against the sheave outer circumference by the powered chain 154. The vine is carried by the power chain 154 and the sheave 148 into the adjacent entrance end of the picking machine conveyor 18' until the vine is pinched or grasped by the inner runs 134' and 136' of the picking machine conveyor for travel through the picking machine, as described above.

Although not essential, preferably the shaft 158a on which idler sheave 158 is mounted can be utilized to also mount the drive sprocket for the transfer conveyor (corresponding to sheave 140 shown in FIG. 1) so as to power the endless chains 82'. Correspondingly, the chain sprocket at the adjacent end of endless chain 132' may be mounted on the same shaft 156a used to mount idler sprocket 156 so that the drive motor 162 may also be used to power the machine conveyor 18'. To this end, the sprockets at the adjacent ends of the endless chains 130' and 132' are interconnected together, for example, by an endless cross chain, not shown, so that both of the endless chains of the picking machine conveyor are powered at the same speed.

Although the junction assembly 146 is illustrated as being incorporated into the intersection of transfer conveyor 16' and machine conveyor 18', a junction assembly similar to that illustrated in FIG. 6 may be incorporated into one or more of the magazines 14a, 14b, 14c. In addition, the junction assembly 146 may be incorporated into the machine conveyor rather than at the intersection of the machine conveyor with the transfer conveyor. Further alternatively, the junction assembly may be incorporated into an auxiliary conveyor (not shown) positioned between the transfer conveyor 16' and the machine conveyor 18'. It will be appreciated that the junction assembly allows the magazines to be placed at desired locations relative to the picking machine, thereby to accommodate pre-existing picking machine installations and/or space limitation at a picking machine site.

It is also to be appreciated that the sheave 148 can be replaced by a functionally equivalent structure. For instance, in place of sheave 148, it would be possible to employ a curved moving boundary in the form of an endless chain or similar "line" element adapted to ride along a curved track that simulates the portion of the outer circumference of the sheave 148 extending between the transfer conveyor 16' and the machine conveyor 18'. Such a track would enable a relatively large radius junction assembly to be used without the necessity of a large radius, full circumference sheave.

The embodiments of the invention in which an exclusive property or privilege is claimed are defined as follows:

The embodiments of the invention in which an exclusive property or privilege is claimed are defined as follows:

1. A hop vine transfer system to supply hop vines to the entrance of a hop picking machine, comprising:
   (a) a plurality of hop vine magazines each having an entrance end portion and an exit end portion and each having gripping means extending between the entrance and exit end portions, the gripping means capable of gripping hop vine stubs, wherein:
   each magazine entrance end portion is in engagement with a feeder system for feeding the stub portions of hop vines into the entrance end portion of the magazine to be received by the magazine gripping means; and
   the exit end portions of the magazines converge towards each other;
   (b) means for powering the vine gripping means of the magazines to move the hop vines received from the feeder systems along the magazines toward the exit end portions of the magazines; and
   (c) a transfer conveyor having an entrance end portion and an exit end portion, with the exit end portion of the transfer conveyor in communication with the entrance of the hop picking machine, and with the entrance end portion of the transfer conveyor selectively movable to align with the exit end portions of the hop vine magazines to receive the hop vines being held in the magazines and transfer the vines to the entrance of the hop picking machine.

2. The hop transfer system according to claim 1, wherein the exit end portions of the hop vine magazines converge towards a point.

3. The hop vine transfer system according to claim 2, wherein the exit end portions of the hop vine magazines extend along a substantially straight line.

4. The hop vine transfer system according to claim 1:
   (a) wherein at least one of the hop vine magazines includes at least two sections, a first section associated with the magazine entrance end portion and a second section associated with the magazine exit end portion, the two magazine sections disposed angularly to each other and each having gripping means extending along the length thereof; and
   a junction assembly at the intersection of the two magazine sections for transferring hop vines from the gripping means of the magazine first section to the gripping means of the magazine second section.

5. The hop vine transfer system according to claim 4, wherein the junction assembly comprises:
   (a) a curved traveling boundary disposed tangentially to the adjacent ends of the magazine first and second sections;
   (b) line means for extending along the curved boundary to cooperate with the outer circumference of the sheave to receive hop vines from the first magazine section and transfer such hop vines to the magazine second section; and,
   (c) means for powering one of the curved boundary and line means.

6. The hop vine transfer system according to claim 5, wherein the curved boundary comprises a sheave.

7. The hop vine transfer system according to claim 6, wherein the line means includes an endless chain.

8. The hop vine transfer system according to claim 7, wherein the junction assembly further comprises chain sprockets positioned adjacent the outer circumference of the sheave for engaging the chain and positioning the chain adjacent the outer circumference of the sheave.

9. The hop vine transfer system according to claim 5, wherein the junction assembly further comprising power transmission means interconnected between the power means and the first and second magazine sections to power the gripping means of the first and second magazine sections to move hop vines along the first and second magazine sections.

10. The hop vine transfer system according to claim 1, wherein the gripping means of the hop vine magazines includes a pair of endless lines disposed in substantially parallel side-by-side relationship, each line defining an inward run closely adjacent the inward run of the opposite endless line, with the inward runs of the two lines spaced close enough to each other to grip the butt portions of the hop vines therebetween.

11. The hop vine transfer system according to claim 10, wherein:

(a) at least one of the magazines is composed of at least two sections, a first section associated with the magazine entrance end portion and a second section associated with the magazine exit end portion, the two magazine sections disposed angularly to each other and each comprising a pair of endless lines disposed in substantially parallel side-by-side relationship to each other to each define an inward run closely adjacent the inward run of the opposite endless line, with the inward runs of the two lines of each magazine section spaced close enough to each other to grip the butt portions of the hop vines therebetween; and, (b) a junction assembly at the intersection of the two magazine sections for transferring vines from the first magazine section to the second magazine section.

12. The hop vine transfer system according to claim 11, wherein the junction assembly comprising:

(a) a sheave substantially tangentially lined with the inward run of one of the endless lines of each of the two magazine sections;

(b) line means for extending around the portion of the outer circumference of the sheave extending corresponding to the distance along the outer circumference of the sheave extending between the tangential intersection of the sheave with the inward runs of the endless lines of the first and second magazine sections; and (c) means for powering one of the sheave and line means to receive hop vines from the adjacent end of the first magazine section, move the hop vine around a portion of the outer circumference of the sheave while the hop vine is being held by the outer circumference of the sheave and the line means and transfer the hop vine to the inward runs of the two lines of the second magazine section.

13. The hope vine transfer system according to claim 12, further comprising idler sprockets positioned outwardly adjacent the outer circumference of a sheave, a first idler sprocket positioned at the location that the adjacent end of the first magazine section tangentially intersects the sheave and a second idler sprocket positioned at the location that the adjacent end of the second magazine section tangentially intersects the sheave, the sprockets engaging with the line means to define the extent to which the line means extend around the outer circumference of the sheave.

14. The hop vine transfer system according to claim 12, wherein the junction assembly further comprises power transmission means interconnected between the power means and the first and second magazines to power the endless lines of the first and second magazine sections to move the hop vines along the first and second magazine sections when held between the inner runs of the endless lines of the first and second magazine sections.

15. The hop vine transfer system according to claim 10, wherein the gripping means of the hop vine magazines further comprise line guides extending along at least the inward runs of the lines to restrain the lines from deflecting transversely away from the inward run of the opposite endless line.

16. The hop vine transfer system according to claim 10, wherein the means for powering the vine gripping means of the magazines power the two endless lines of the magazine to move in unison.

17. The hop vine transfer system according to claim 10, wherein the endless lines comprise endless chains and sprocket means at the ends of the magazines for engaging the chains.

18. The hop vine transfer system according to claim 1, wherein the hop vine magazines further comprise means for positioning the hop vines along the magazines at a desired spacing apart from each other.

19. The hop vine transfer system according to claim 18, wherein the positioning means moves the gripping means a selective distance along the magazine upon receipt of a hop vine from the feeder system.

20. The hop vine transfer system according to claim 1, wherein the hop vine magazines further comprise means for sensing the number of vines in a magazine and discontinuing the feeding of vines into the entrance portion of the magazine when the magazine is full and for resuming the feeding of the hop vines into the entrance portion of the magazine after the vines from the magazine have been emptied onto the transfer conveyor.

21. The hop vine transfer system according to claim 1, wherein the transfer conveyor is pivotal about an axis located at the exit end portion of the transfer conveyor to move the entrance end portion of the transfer conveyor from magazine to magazine.

22. The hop vine transfer system according to claim 20, further comprising means for pivoting the transfer conveyor about its pivot axis thereby to selectively align the entrance end portion of the transfer conveyor with the exit end portions of the magazines.

23. The hop vine transfer system according to claim 21, wherein the exit end portions of the magazines converge towards the pivot axis of the transfer conveyor.

24. The hop vine transfer system according to claim 21, wherein when the entrance end portion of the transfer conveyor is in alignment with the exit end portion of a magazine, the transfer conveyor is in substantial longitudinal alignment with the exit end portion of the magazine.

25. The hop vine transfer system according to claim 1, wherein the transfer conveyor comprises two side-by-side endless lines, wherein the inward runs of the endless lines are disposed in close side-by-side relationship to each other to define a pinch track therebetween to pinch and hold the stubs of the hop vines therebetween.

26. The hop vine transfer system according to claim 25, wherein the transfer conveyor includes means to power the endless lines to move the vines along the transfer conveyor as the vines are held between the inward runs of the endless lines.

27. The hop vine transfer system according to claim 25, wherein the transfer conveyor includes guides extending along the inward runs of the endless lines to restrain the inward lines from deflecting transversely relative to the length of the endless lines away from the inward run of the opposite endless line.

28. The hop vine transfer system according to claim 25, wherein the endless lines comprise chains and the transfer conveyor further comprises sprockets at the end portions of the transfer conveyor to engage the endless chains.

29. A hop vine transfer system according to claim 1:
   (a) wherein the exit end portion of the transfer conveyor is disposed angularly to the entrance of the hop picking machine; and
   (b) further comprising a junction assembly at the intersection of the exit end portion of the transfer conveyor and the entrance of the hop picking machine for transferring hop vines from the transfer conveyor to the relatively angularly situated hop picking machine.

30. A hop vine transfer system according to claim 29, wherein the junction assembly includes:
   (a) a curved movable boundary structurally independent of, and tangentially associated, with the exit end portion of the transfer conveyor and the entrance of the hop picking machine;
   (b) line means for extending around the movable boundary to cooperate therewith to define junction vine gripping means to receive hop vines from the exit end portion of the transfer conveyor and transfer such hop vines to the entrance end portion of the hop picking machine; and
   (c) means for powering one of the movable boundary and line means.

31. The hop vine transfer system according to claim 30, wherein the curved boundary comprises a sheave.

32. The hop vine transfer system according to claim 30, wherein the junction assembly further comprising power transmission means interconnected between the power means and the transfer conveyor to power the transfer conveyor to move hop vines along the transfer conveyor.

33. A hop vine transfer system for transferring hop vines from a plurality of unloading stations to the entrance portion of a hop picking machine conveyor with the stub ends of the hop vines being held by the hop picking machine conveyor to vertically suspend the hope vines from the hop picking conveyor as the hop vines are carried by the hop picking conveyor through the hop picking machine, the transfer system comprising:
   (a) a plurality of hop vine magazines disposed at substantially the same elevation as the hop picking machine conveyor, the magazines each having an entrance end portion and an exit end portion and hop vine gripping means extending between the entrance and exit end portions of the magazines, wherein:
      the magazine entrance end portions receive vines from a corresponding unloading station thereupon to be gripped by the gripping means;
      the exit end portions of the hop vine magazines converge towards a point distal from the exit end portions of the magazines;
   (b) a transfer conveyor having an entrance end portion and an exit end portion, the exit end portion of a transfer conveyor being positioned adjacent the entrance end portion of the hop picking machine conveyor, the transfer conveyor being pivotal about an axis near its exit end portion; and
   (c) means for pivoting the transfer conveyor about its pivot axis to selectively align the entrance end portion of the transfer conveyor with the exit end portions of the hop vine magazines to receive hop vines from the magazines and transfer the hop vines from the magazines to the entrance end portion of the hop picking machine conveyor.

34. The hop vine transfer system according to claim 33, wherein the exit end portions of the hop vine magazines extend along a substantially straight line towards their distal convergence point.

35. The hop vine transfer system according to claim 33, wherein the hop vine magazines each extend along a substantially straight line towards the distal convergence point of the magazines.

36. The hop vine transfer system according to claim 33, wherein the gripping means of the hop vine magazines comprise a pair of moving jaws extending between the entrance and exit end portions of the magazines and disposed in close side-by-side relationship to each other to grip the butt portions of the hop vines therebetween.

37. The hop vine transfer system according to claim 36, further comprising backing guides along which the jaws of the magazines move, the backing guides guiding the moving jaws and restraining the moving jaws from moving in a direction transversely away from the opposite moving jaw.

38. The hop vine transfer system according to claim 36, wherein the moving jaws comprise endless chains and sprocket means at the ends of the magazines for engaging the endless chains.

39. The hop vine transfer system according to claim 33, wherein the hop vine magazines further comprise means for positioning the hop vines along the magazines at a desired spacing of the hop vines apart from each other.

40. The hop vine transfer system according to claim 39, wherein the positioning means advances the gripping means a selective distance along the magazine toward the exit end portion of the magazine upon receipt of a hop vine from an unloading station.

41. The hop vine transfer system according to claim 33, further comprising means for sensing when a magazine is filled with hop vines and discontinuing the feeding of the hop vines into the entrance portion of the filled magazine and for resuming the feeding of hop vines into the entrance portion of the magazine after the hop vines from the magazines have been emptied onto the transfer conveyor.

42. The hop vine transfer system according to claim 33, wherein the exit end portions of the magazine converge towards the pivot axis of the transfer conveyor.

43. The hop vine transfer system according to claim 33, wherein the transfer conveyor comprises a pair of moving jaws extending from the entrance end portion to the exit end portion of the transfer conveyor and disposed in close side-by-side relationship to each other to grip the stub ends of the hop vines therebetween.

44. The hop vine transfer system according to claim 43, wherein the transfer conveyor further includes guideways extending along the moving jaws to guide the moving jaws as they move from the entrance to the exit end portions of the transfer conveyor and to restrain the moving jaws from moving transversely relative to the length of the moving jaws away from the opposite moving jaw.

45. The hop vine transfer system according to claim 43, wherein the moving jaws comprise a pair of endless chains and sprockets at the end portions of the transfer conveyor to engage the endless chains.

46. The hop vine transfer system according to claim 33:

(a) wherein the exit end portion of the transfer conveyor is angularly disposed relative to the entrance end portion of the hop picking machine conveyor; and (b) further comprising a junction assembly at intersection of the exit end portion of the transfer conveyor and the entrance end portion of the hop picking machine conveyor for transferring hop vines from the exit end portion of the transfer conveyor to the entrance end portion of the hop picking machine conveyor.

47. The hop vine transfer system according to claim 46, wherein the junction assembly comprises:

(a) a sheave tangentially associated with the adjacent ends of the exit end portion of the transfer conveyor and the entrance end portion of the hop picking machine conveyor;

(b) an endless line extending around a portion of the circumference of the sheave to cooperate with the outer circumference of the sheave to receive hop vines from the exit end portion of the transfer conveyor and transfer such hop vines to the entrance end portion of the picking machine conveyor by rotation of the sheave and the holding of the hop vine against the rotating sheave by the line means; and (c) means for powering one of the sheave and endless line.

48. The hop vine transfer system according to claim 47, wherein the junction assembly further comprising power transmission means interconnected between the power means and at least one of the transfer conveyor and hop picking machine conveyor to power such interconnected conveyor with the power means.

49. The hop vine transfer system according to claim 33, wherein at least one of the hop vine magazines includes at least two sections, a first section associated with the magazine entrance end portion and a second section associated with a magazine exit end portion, the two magazine sections disposed angularly to each other; and a junction assembly at the intersection of the two magazine sections for transferring hop vines from the gripping means of the magazine first section to gripping means of the magazine second section.

50. The hop vine transfer system according to claim 49, wherein the junction assembly comprises:

(a) a sheave tangentially associated with the adjacent ends of the magazine first and second sections;

(b) line means for extending around a portion of the circumference of the sheave to cooperate with the outer circumference of the sheave to define junction assembly moving gripping means to receive hop vines from the gripping means of the magazine first section and transferring such hop vines to the gripping means of the magazine second section; and (c) means for powering the junction assembly gripping means.

51. The hop vine transfer system according to claim 50, wherein the junction assembly further comprises idler wheels positioned adjacent the outer circumference of the sheave for engaging the line means and positioning the line means adjacent the outer circumference of the sheave.

52. The hop vine transfer system according to claim 50, wherein the junction assembly further comprising power transmission means interconnected between the power means and at least one of the first and second magazine sections to power the gripping means of the at least one of the first and second magazine sections to move the hop vines along the at least one first and second magazine sections.

* * * * *